March 10, 1964 J. H. CAMERON 3,124,162
MULTI-WAY DISTRIBUTOR VALVE
Filed April 30, 1962 2 Sheets-Sheet 1
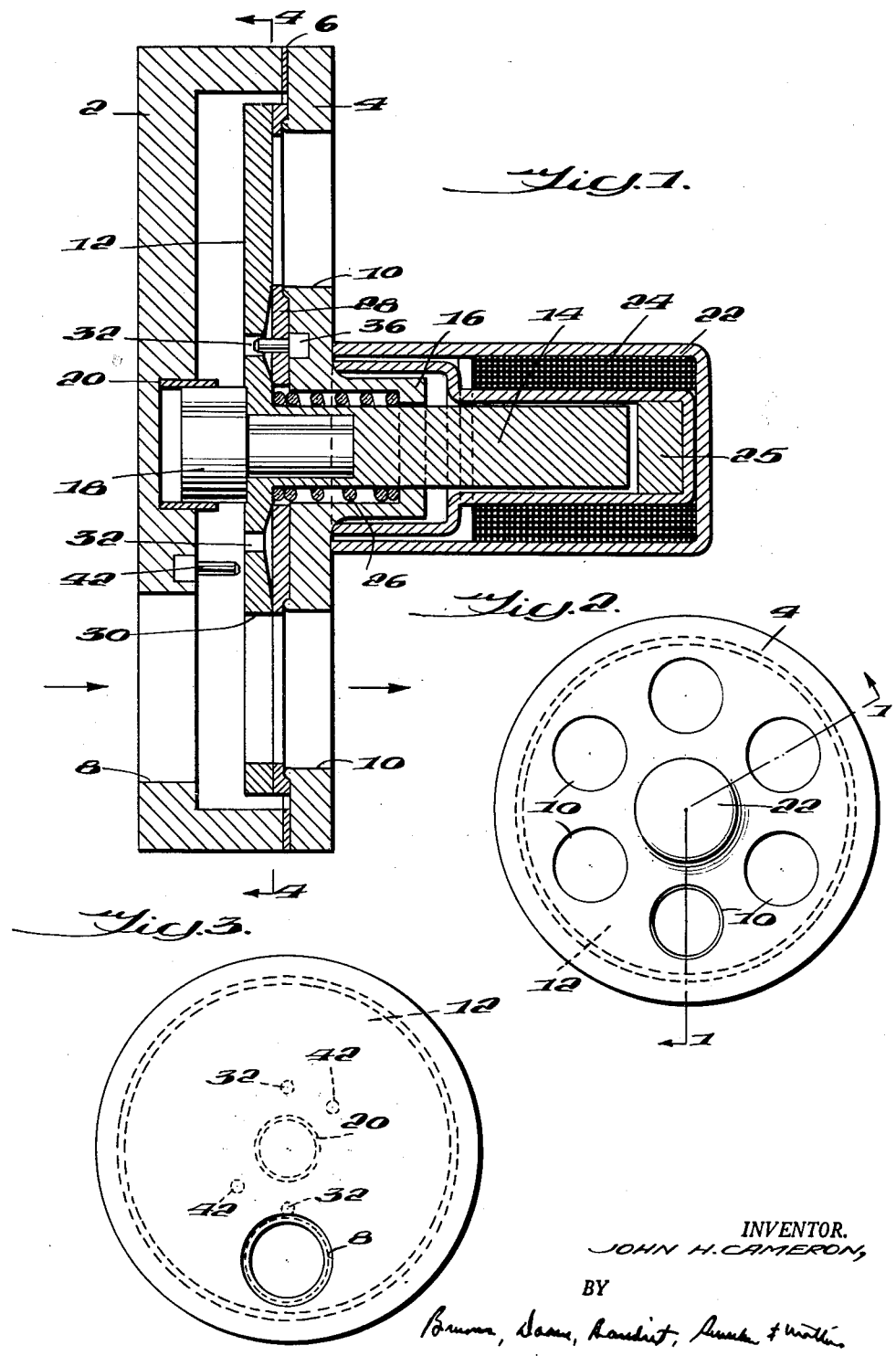
INVENTOR.
JOHN H. CAMERON,
BY
ATTORNEYS March 10, 1964  J. H. CAMERON  3,124,162

MULTI-WAY DISTRIBUTOR VALVE

Filed April 30, 1962  2 Sheets-Sheet 2

INVENTOR.
JOHN H. CAMERON,
BY
ATTORNEYS

United States Patent Office 3,124,162
Patented Mar. 10, 1964

3,124,162
MULTI-WAY DISTRIBUTOR VALVE
John H. Cameron, 81 Alston Ave., New Haven, Conn.
Filed Apr. 30, 1962, Ser. No. 190,952
8 Claims. (Cl. 137—625.11)

This invention relates to fluid valves, and more particularly, to a device for distributing sequentially fluid to a plurality of conduits.

Fluid distributing devices are used for supplying fluid to a plurality of fluid conduits from a single main. Various types of such distributing devices are used in irrigation systems, industrial process machinery, chemical replenishment, fountain display, plating processes, heat treating fluid control and in lawn sprinkling. Often the conduits which are supplied from the valve are arranged in such a manner that the fluid must flow through the conduits in a particular sequence to accomplish a particular function. This may be accomplished by providing an individual valve for each conduit, but this is expensive since a large number of valves are required and each valve is operated indepndently.

In many applications it is particularly important that the fluid be distributed to the conduits in a particular sequence. Attempts have been made to accomplish this result by providing valves with manual or geared motors to operate the sequential opening of each conduit. Manual valves are undesirable since they require constant attention by an operator and the motor operated valves heretofore proposed are large, expensive and unreliable.

In piping layouts, it is often important that the valve structure be as small in size as possible so as not to obstruct unnecessarily the layout of adjacent piping. A plurality of individual valves or motor operated valves such as heretofore proposed do not meet this criteria since their combined structures necessarily take up a large amount of space and require extra lengths of pipe to lead around such valves.

Accordingly, it is an object of this invention to provide a valve for automatically distributing fluid to a plurality of conduits in sequence.

It is a further object of this invention to provide a sequential distributing valve which is inexpensive and which is relatively small in size.

It is a still further object of this invention to provide an automatic sequencing valve which may be remotely operated.

It is another object of this invention to provide an automatic sequencing valve which is economical to operate and capable of operating a variety of arrangements of conduits.

These objects are accomplished in accordance with a preferred embodiment of the invention by a rotary valve. One side wall of the valve body has a fitting for an inlet pipe and a plurality of fittings for outlet conduits are spaced angularly around the opposite side wall of the housing. Within the housing, a circular disc is journaled in bearings for rotation and for axial displacement longitudinally in the valve body. The disc has a single hole at the same radius from the central axis of the housing as the inlet and outlet fittings. A spring urges the disc away from the outlet fittings and an electric solenoid urges the disc toward the outlet fittings. Rotation of the disc is accomplished by a plurality of countersunk holes which are arranged on opposite sides of the disc. Pins are mounted in the housing in position to engage countersunk holes, so that when the disc is reciprocated by the spring or the solenoid, the pins engage the countersunk portions of the holes and by camming action rotate the disc. Thus, by alternately energizing and deenergizing the solenoid, the disc indexes from one outlet conduit to the next.

This preferred embodiment of the invention is illustrated in the accompanying drawings, in which:

FIG. 1 is a cross-sectional view of the valve along the line 1—1 in FIG. 2;

FIG. 2 is an end view in elevation of the valve of this invention, showing the outlet fittings;

FIG. 3 is an end view in elevation of the valve, showing the inlet fitting;

Figure 4:
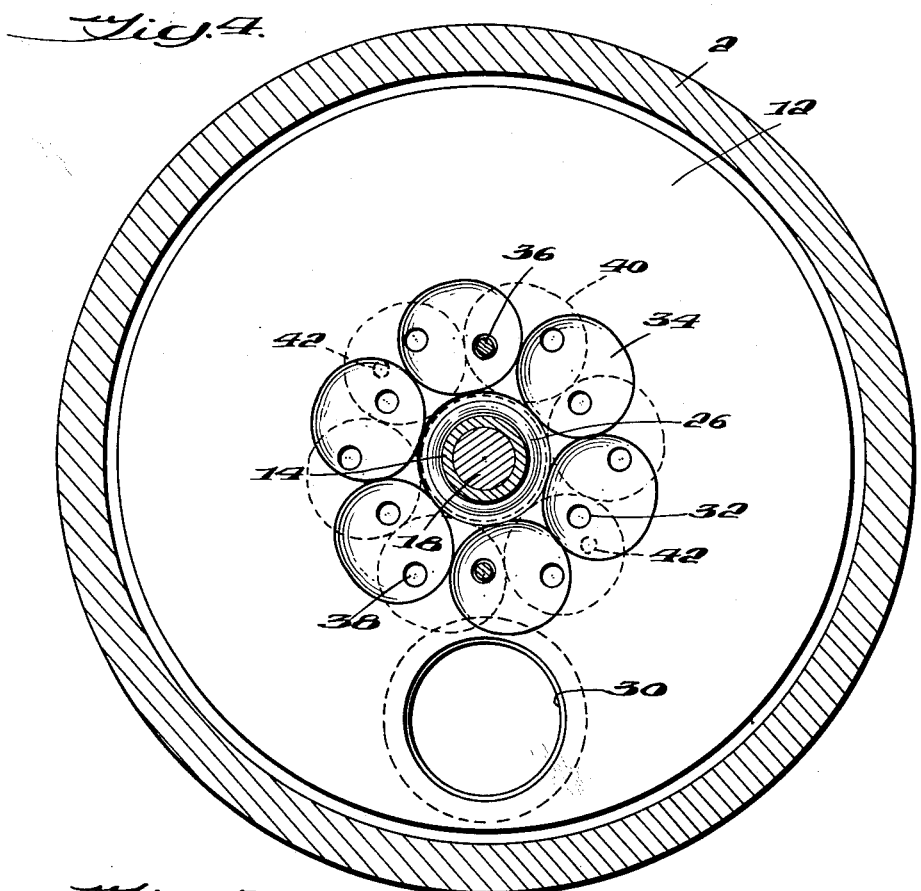
FIG. 4 is a cross-sectional view of the valve along the line 4—4 in FIG. 1.

Referring to FIGS. 1, 2 and 3, the valve shown as an embodiment of this invention includes a cylindrical or cup-shaped valve body 2, and a cover plate 4 which is secured to the valve body 2 by any suitable means such as by screws with a gasket 6 interposed between the valve body and cover plate 4 to seal against the leakage of fluid. An internally threaded pipe fitting 8 is provided for fastening a fluid inlet pipe to the valve body and six similar pipe fittings 10 for outlet conduits are provided in the cover plate 4. The outlet pipe fittings are arranged in a circle, as shown in FIG. 2, around the central axis of the valve body.

In the cavity between the valve body 2 and the cover plate 4, a circular disc 12 is secured to a shaft 14 which is journaled in a bearing member 16 on the cover plate 4. It has been found that turbulence in the valve is minimized if the sizes of the valve body 2 and the disc 12 are such that when the disc is displaced adjacent the cover plate 4, the distance between the exposed face of the disc and the opposite interior wall of the valve body 2 is approximately one-third of the diameter of the inlet hole 8. A shaft insert 18 extends through the disc 12 and is secured in the shaft 14. The enlarged end of the insert 18 is journaled in a cylindrical bearing insert 20 which is secured to the valve body 2. By this arrangement, the shaft 14 and the disc 12 are mounted for rotation and for longitudinal movement along the central axis of the valve body 2.

A housing 22 is secured to the outer face of the cover plate 4. Within the housing, a solenoid coil 24 is mounted to enclose a portion of the shaft 14. The coil 24 is arranged to draw the shaft 14 into the coil 24 when the solenoid is energized. A solenoid attractor 25 in the interior of the coil 24 increases the force on the shaft 14 when the solenoid coil is energized. A coiled spring 26 is compressed between the interior of the bearing member 16 and a face of the disc 12 and yieldably urges the disc away from the cover plate 4. A sealing disc 28 is secured to the inside surface of the cover plate 4 and forms a fluid tight seal between the disc 12 and the cover plate 4 when the disc 12 is positioned adjacent the outlet fittings 10. The disc 12 is provided with a single opening or passageway 30 which is arranged to register with each of the outlet fittings 10.

Figure 5:
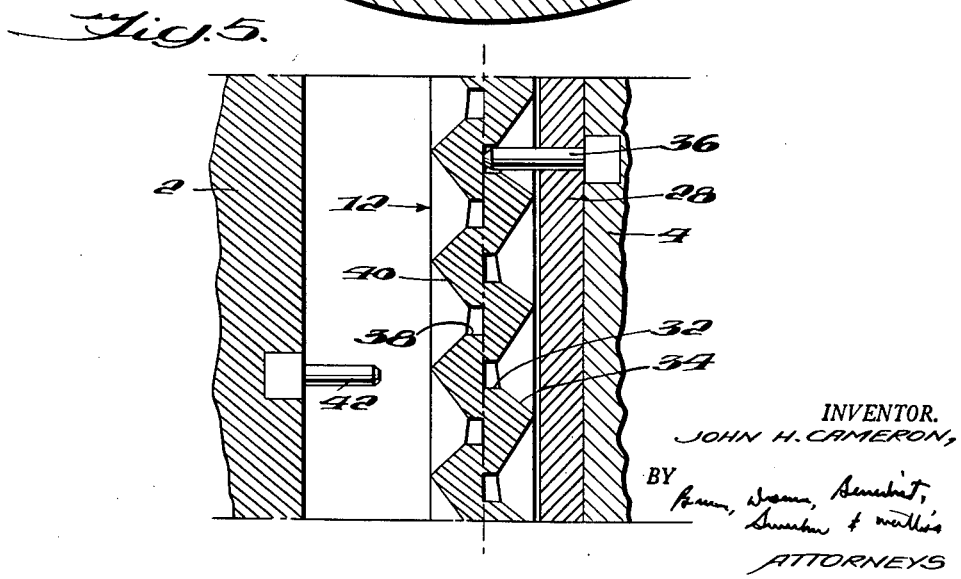
FIG. 5 is a cross-sectional view, partially schematic, showing the countersunk holes in the disc.

Referring to FIGS. 1, 4 and 5, the disc 12 is caused to rotate by means of a plurality of countersunk holes arranged in concentric circles on the disc. Each of the holes 32 in one circle is countersunk on the face of the disc adjacent the cover plate 4 in an oblique manner to form cam surfaces 34 around each hole 32. The portion of each countersink on the leading side of each hole has a smaller slope than that on the trailing side of the hole. A pair of pins 36 are secured to the cover plate 4 and extend outward therefrom to engage the countersunk holes 32 as the disc is rotated. The base of each pin 36 is enlarged to resist thrust and to provide a secure mounting in the cover plate. The free ends of the pins are chamfered to cooperate with the cam surfaces of the countersinks 34. A second ring of holes 38 is arranged on the disc 12 at a slightly greater diameter than the holes 32. The holes 38 are countersunk on the face of the disc adjacent the valve body 2 obliquely to form countersinks 40 in a similar manner to the countersink 34. A pair of pins 42, which are of substantially the same shape as the pins 36, is secured to the valve body 2 and extends outwardly to engage the holes 38 and countersinks 40. The distance between the chamfered ends of the pins 36 and 42 is large enough for each pin to freely rotate the disc 12 without interference from the opposite pin.

FIG. 5 is a schematic view showing the relative angular positions of the countersunk holes 32 and 38. The portion of FIG. 5 on the left side of the phantom line is a sectional view of the disc 12 at the radius of the circular centerline of the holes 38 and the portion to the right of the phantom line is a sectional view at the radius of the centerline of the holes 32. Thus, FIG. 5 shows the relative angular positions of the countersunk holes in the disc 12 relative to the pins 36 and 42. Since the countersinks 34 and 40 are drilled obliquely to the centerline of the holes 32 and 38, the portion of the countersink on one side, the leading side, of the hole is substantially longer and of smaller slope than the countersunk portion on the trailing side of the hole. This is an important feature of the invention since it is necessary that the pins during each reciprocation cause the disc 12 to rotate through a sufficient distance to ride over the ridge between adjacent countersunk holes.

When the disc 12 is caused to reciprocate by means of the spring 26, it moves from a position adjacent the cover plate 4 to a position adjacent the valve body 2. During this movement, the pin 42 engages the leading portion of a countersink 40 and cams the disc 12 to rotate the disc through one-twelfth of a revolution until the pin 42 lodges in the hole 38. During this movement of the disc 12, the pin 36 is withdrawn from the hole 32 and after rotation of the disc 12 by the pin 42, the pin 36 is positioned above the leading portion of the next adjacent countersink 34.

In FIG. 5, the disc 12 rotates upward one-twelfth of a revolution upon each shifting to the right or to the left of the disc 12. When the disc 12 is reciprocated back toward the cover plate 4 by the solenoid 24, the pin 36 cooperates with a countersink 34 to cam the disc 12 through an additional one-twelfth of a revolution. Thus, during each complete cycle in moving away from the cover plate 4 and then back toward the cover plate 4, the disc is caused to rotate through one-sixth of a revolution. Since there are six outlet fittings 10 in the cover plate 4 in this embodiment of the invention, each complete cycle rotates the disc and its passageway 30 from one outlet fitting 10 to the next adjacent outlet fitting. The number of outlets can be changed as found desirable, with a corresponding change in number of the countersunk holes.

It will be apparent that when a source of fluid is connected to the fitting 8 in the valve body, the valve disc 12 is rotated each time the solenoid 24 is deenergized momentarily to uncover the next adjacent outlet fitting so that each of the conduits connected to the cover plate 4 is furnished in sequence with a supply of fluid.

In operation, the valve body 2 is connected to a fluid supply such as a water main at the inlet fitting 8. A plurality of distributing conduits are connected to the outlet fittings 10. When the solenoid 24 is energized, the disc registers the opening 30 with one of the outlet fittings 10 by means of the pins 36 which engage the countersunk holes 32. When it is desired to shut off the fluid from one conduit to supply fluid to the next adjacent conduit, the solenoid 24 is deenergized for a sufficient time to give to the spring 26 an opportunity to shift the disc 12 against the valve body 2 and thereby rotate the disc one-twelfth of a revolution. When the solenoid 24 is energized again, the movement of the disc 12 toward the cover plate 4 engages the pins 36 to cam the disc 12 an additional one-twelfth revolution to bring the hole 30 in register with the next outlet fitting 10. The operation of the valve is rapid and the sealing disc 28 restricts the leakage of fluid through the inactive conduits while the disc is indexing to the next conduit.

One of the important features of the invention is that the valve operates positively in both directions by the combination of the coil spring 26 and the solenoid 24. Furthermore, the valve of this invention may be oriented in any position and operates under the positive closure and retraction of the spring and solenoid rather than relying on gravity forces as in conventional valves. Although fluid pressure does not actuate the valve, the valve is arranged to take advantage of fluid pressure to assist sealing of the disc 12 against the cover plate 4. The fluid inlet fitting 8 is in communication with the interior of the valve body 2 and when the disc 12 is in the position shown in FIG. 1, the fluid exerts a pressure on the outer face of the disc 12 to compress it against the sealing disc 28 to prevent leakage of fluid through the closed outlet fittings 10.

As one modification, the solenoid may be mounted on the opposite side of the disc 12 from the spring 26 to move the disc 12 against the cover plate 4 by means of current through the solenoid coil 24 which drives the shaft 14 out of the coil. The valve is shown with a single orifice 30 in the disc 12, but if desired, two or more such orifices may be provided in the plate for accomplishing simultaneous distribution through two or more conduits.

The arrangement of the valve minimizes turbulence and produces a pressure drop across the valve which is substantially the same as that of a conventional reducing coupling and significantly less than occurs in solenoid actuated hydraulic valves. Due to the inherent dash pot effect of the valve, water hammer does not occur. Also, the valve has no tendency to clog and strainers are not necessary. The large opening or orifice 30 in the disc 12 does not trap particles which may be present in the fluid and therefore strainers are not necessary. Furthermore, since the disc 12 and shaft 14 are the only moving parts, wear in the valve is minimized and should the disc eventually become excessively worn, it may be replaced easily by removing the cover plate 4. It has been found that the valve of this invention has a greater useful life due to the elimination of flexural stresses as occur in diaphragm valves. The disc 12 is subjected only to compressive stresses, while the sealing members of diaphragm valves are subjected to compressive and flexural stresses.

The valve of this invention may be used as a component in hydraulic systems for special purposes. In one system, it may be used in cooperation with a conventional solenoid valve in the main fluid supply pipe. The solenoid of the conventional main valve is connected in series with the solenoid 24 of the valve of this invention and during each change of position of the disc 12, the main valve is closed so that no fluid pressure is on the valve and no leakage of fluid from the inactive conduits is obtained. When the solenoid 24 is energized, the main solenoid valve opens to permit fluid to flow through both valves.

While this invention has been illustrated and described in one embodiment, it is recognized that variations and changes may be made therein without departing from the invention as set forth in the claims.

I claim:

1. A sequencing valve comprising a housing, an inlet port in the housing, a plurality of outlet ports in the housing, disc for closing at least one of the outlet ports, a shaft journaled for longitudinal and rotary motion, said disc being secured to the shaft, means for reciprocating the shaft longitudinally, a plurality of cam surfaces on opposite faces of the disc and means in the housing for cooperating with the cam surfaces to rotate the disc to uncover sequentially the outlet ports.

2. A sequencing valve comprising a housing, an inlet port in one end of the housing, a plurality of outlet ports arranged circularly in the opposite end of the housing, a shaft journaled in the housing for rotating and reciprocating motion, a disc on the shaft, said disc extending in overlapping relation with each of the outlet ports and having a passage extending therethrough in position to register with each of the outlet ports, a plurality of sockets in the disc uniformly spaced in two concentric circles, the sockets of one circle being countersunk on the obverse surface of the disc, the sockets of the other circle being countersunk on the reverse surface of the disc, a first set of pegs mounted in the housing in position to engage the sockets on the obverse side of the disc, a second set of pegs mounted in the housing in position to engage the sockets on the reverse side of the disc, and means for reciprocating the disc axially whereby the pegs alternately engage the countersunk sockets to rotate the disc to uncover sequentially the outlet ports.

3. A sequencing valve comprising a housing, an inlet port in the housing, a plurality of outlet ports in the housing, valve means for closing at least one of the outlet ports, said valve means journaled for reciprocating and rotary motion, about its central axis, a plurality of countersunk sockets on the valve means arranged in two concentric circles about the central axis, the countersinks of the sockets in one circle facing oppositely from those of the sockets in the other circle, means for reciprocating the valve means along the central axis, pins in the housing to engage the sockets whereby rotary motion is imparted to the valve means.

4. A sequencing valve comprising a housing, an inlet port in the housing, a plurality of outlet ports in the housing, valve means for closing at least one of the outlet ports, said valve means journaled for reciprocating and rotary motion, about its central axis, a plurality of countersunk sockets on the valve means arranged in two concentric circles about the central axis, the countersinks of the sockets in one circle facing oppositely from those of the sockets in the other circle, said countersinks being formed obliquely of the sockets, means for reciprocating the valve means along the central axis, pins in the housing to engage the sockets whereby rotary motion is imparted to the valve means.

5. A sequencing valve comprising a housing, an inlet port in the housing, a plurality of outlet ports in the housing, valve means for closing at least one of the outlet ports, a shaft journaled for longitudinal and rotary motion, said valve means being secured to the shaft, a solenoid coil in the housing in axial alignment with the shaft, said shaft forming an armature in the coil, a plurality of countersunk sockets on the valve means arranged in two concentric circles about the central axis, the countersinks of the sockets in one circle facing oppositely from those of the sockets in the other circle, and pins in the housing in position for alternately engaging the sockets whereby the valve means is rotated upon energization of the solenoid.

6. A sequencing valve comprising a housing, an inlet port in the housing, a plurality of outlet ports in the housing, valve means for closing at least one of the outlet ports, a shaft journaled for longitudinal and rotary motion, said valve means being secured to the shaft, a solenoid coil in the housing in axial alignment with the shaft, said shaft forming an armature in the coil, a plurality of countersunk sockets on the valve means arranged in two concentric circles about the central axis, the countersinks of the sockets in one circle facing oppositely from those of the sockets in the other circle, said coil upon being energized displacing said shaft axially in one direction, means in the housing for biasing the shaft in the opposite direction and pins in the housing in position for alternately engaging the sockets whereby the valve means is rotated upon energization and upon de-energization of the solenoid.

7. A sequencing valve comprising a housing, an inlet port in the housing, a plurality of outlet ports in the housing, valve means for closing at least one of the outlet ports, a shaft journaled for longitudinal and rotary motion, said valve means being secured to the shaft, a solenoid coil in the housing in axial alignment with the shaft, said shaft forming an armature in the coil, a plurality of countersunk sockets on the valve means arranged in two concentric circles about the central axis, the countersinks of the sockets in one circle facing oppositely from those of the sockets in the other circle, said coil upon being energized displacing said shaft axially in one direction, a spring mounted in the housing between said solenoid and said valve means urging said shaft axially in the opposite direction and pins in the housing in position for alternately engaging the sockets whereby the valve means is rotated upon energization and de-energization of the solenoid.

8. A sequencing valve comprising a housing, an inlet port in one end of the housing, a plurality of outlet ports arranged circularly in the opposite end of the housing, a shaft journaled in the housing for rotating and reciprocating motion, a disc on the shaft, said disc extending in overlapping relation with each of the outlet ports and having a passage extending therethrough in position to register with each of the outlet ports, a plurality of sockets in the disc uniformly spaced in two concentric circles, the sockets of one circle being countersunk on the obverse surface of the disc, the sockets of the other circle being countersunk on the reverse surface of the disc, a first set of pegs mounted in the housing in position to engage the sockets on the obverse side of the disc, a second set of pegs mounted in the housing in position to engage the sockets on the reverse side of the disc, a solenoid coil in the housing in axial alignment with the shaft, said shaft forming an armature in the coil for axially displacing the shaft in one direction when the coil is energized, and means biasing the shaft axially in the opposite direction whereby the pegs alternately engage the countersunk sockets to rotate the disc upon energization and de-energization of the solenoid.

References Cited in the file of this patent

UNITED STATES PATENTS

| | | |
|---|---|---|
| 1,856,350 | Metcalf | May 3, 1932 |
| 2,234,932 | Johnson | July 20, 1943 |
| 2,833,309 | Bird | May 6, 1958 |